United States Patent
Fan

(10) Patent No.: US 8,183,421 B2
(45) Date of Patent: May 22, 2012

(54) BIOFUEL PRODUCTION BY HIGH TEMPERATURE NON-FARADAIC ELECTROCHEMICAL MODIFICATION OF CATALYSIS

(75) Inventor: Qinbai Fan, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 435 days.

(21) Appl. No.: 12/421,123

(22) Filed: Apr. 9, 2009

(65) Prior Publication Data

US 2010/0258447 A1 Oct. 14, 2010

(51) Int. Cl.
*C07C 1/00* (2006.01)
*C07C 13/00* (2006.01)
*C07C 15/02* (2006.01)
*C07C 5/00* (2006.01)
*C07C 4/00* (2006.01)
*C25B 3/00* (2006.01)

(52) U.S. Cl. ........ 585/240; 585/350; 585/400; 585/500; 585/700; 205/413; 205/462

(58) Field of Classification Search .......... 585/240, 585/350, 400, 500, 700; 205/413, 462
See application file for complete search history.

(56) References Cited

U.S. PATENT DOCUMENTS

| | | | |
|---|---|---|---|
| 4,869,016 A * | 9/1989 | Diprose et al. ................ | 43/124 |
| 6,194,623 B1 | 2/2001 | Frenzel et al. | |
| 6,210,557 B1 | 4/2001 | Stochniol et al. | |
| 6,238,543 B1 | 5/2001 | Law, Jr. et al. | |
| 2004/0226830 A1 * | 11/2004 | Ovshinsky et al. ........... | 205/638 |
| 2007/0278108 A1 * | 12/2007 | Rosenzweig et al. ......... | 205/637 |

FOREIGN PATENT DOCUMENTS

JP 2007287542 A * 11/2007

OTHER PUBLICATIONS

Srikar et al., "Structural Design Considerations for Micromachined Solid-Oxide Fuel Cells", Journal of Power Sources (no month, 2004), vol. 125, pp. 62-69.*
Xie et al., "A New Treatment of Organic Wastewater with Electro—Heterocatalysis", Sustainable Energy and Environmental Technologies (no month, 2000), pp. 186-191.*
Belyaev et al., "Oxidation of Methane over Platinum in a Solid Proton-Conducting Electrolyte Cell", Catalysis Letters (no month, 1995), vol. 30, pp. 151-158.*
Vayenas et al., "Non-Faradaic Electrochemical Activation of Catalysis", The J. of Chem. Phys. (no month, 2008), vol. 128, pp. 182506-1 to 182506-13.*
Manica et al., "Characterization of Electrode Fouling and Surface Regeneration for a Platinum Electrode on an Electrophoresis Microchip", Anal. Chem. (no month, 2003), vol. 75, pp. 4572-4577.*
Vayenas, C.G. et al., "Non-Faradaic Electrochemical Modification of Catalytic Activity", J. Phys. Chem. 1988, 92, 5083-5085.

(Continued)

*Primary Examiner* — Edna Wong
(74) *Attorney, Agent, or Firm* — Mark E. Fejer

(57) ABSTRACT

A method for producing biofuels from biomass in which a refined biomass material is introduced into a non-Faradaic electrochemical device, preferably at a temperature greater than or equal to about 150° C., and deoxygenated and/or decarboxylated in said device to produce an increased carbon chain fuel.

26 Claims, 4 Drawing Sheets

OTHER PUBLICATIONS

Ogumi, Zempachi et al., "Application of the Solid Polymer Electrolyte (SPE) Method to Organic Electrochemistry—III. Kolbe Type Reactions on Pt-SPE", Electrochimica Acta, vol. 28, No. 11, pp. 1687-1693, 1983.

Elliott, D.C. et al., "Liquid Fuels by Low-Severity Hydrotreating of Biocrude", Developments in Thermochemical Biomass Conversion, vol. 1, pp. 611-621, 1996.

Ellis, Keith G. et al., "Electro-Orgtanic Reactions—XXX. Cleavage and Coupling of Some Biomass-Derived Organic Compounds", J. Electrochem. Soc., vol. 134, No. 12, pp. 3058-3062, Dec. 1987.

Conway, B.E. et al., "New Approaches to the Study of Electrochemical Decarboxylation and the Kolbe Reaction—Part II. The Model Reaction with Trifluoroacetate and Comparisons with Aqueous Solution Behavior", Canadian Journal of Chemistry, vol. 41, pp. 38-54 (1963).

Iwahara, Hiroyasu, "Technological Challenges in the Application of Proton Conducting Ceramics", Solid State Ionics 77 (1995) 289-298.

Vayenas, Costas G., et al., "Non-Faradaic Electrochemical Activation of Catalysis", The Journal of Chemical Physics 128, pp. 182506-1-182506-13, (2008).

Lund, H. et al., "Coupure Cathodique De Liaisons Carbone-Oxygene—1, Reduction Electrochimique D'Alcools Insatures Application A La Reduction Tetraelectronique De Certaines Cetones en Carbures", Electrochimica Acta, 1974, vol. 19, pp. 629-637.

* cited by examiner

Anode: $2H_2O \longrightarrow O_2 + 4H^+ + 4e^-$

Cathode: $2R'OH + 2H^+ + 2e^- \longrightarrow R'-R' + 2H_2O$

Anode: $2RCOOH \longrightarrow R-R + 2CO_2 + 2H^+ + 2e^-$

Cathode: $2H^+ + 2e^- \longrightarrow H_2$

Anode: $2RCOOH \longrightarrow R\text{-}R + 2CO_2 + 2H^+ + 2e^-$

Cathode: $2R'OH + 2H^+ + 2e^- \longrightarrow R'\text{-}R' + 2H_2O$

BIOFUEL PRODUCTION BY HIGH TEMPERATURE NON-FARADAIC ELECTROCHEMICAL MODIFICATION OF CATALYSIS

BACKGROUND OF THE INVENTION

1. Field of the Invention

This invention relates to a method for producing biofuels. In one aspect, this invention relates to a method for producing biofuels from biomass. In another aspect, this invention relates to the production of biofuels using the NEMCA effect, i.e. non-Faradaic electrochemical modification of catalytic activity, also known as electrochemical promotion of catalysis (EPOC).

2. Description of Related Art

The principal methods for producing chemicals from biomass are biomass refining or pretreatment, thermo-chemical conversion (gasification, pyrolysis, hydro-thermal-upgrading (HTU)), fermentation and bioconversion, and product separation and upgrading. There are five main categories of building blocks that can be identified as intermediates for the production of chemical products from biomass:

1) Refined biomass, i.e. biomass from which the valuable components, having been made accessible by physical and/or mild thermo-chemical treatment, are extracted after which the remaining biomass undergoes further transformation;
2) Biosyngas, primarily CO and $H_2$, which is a multifunctional intermediate for the production of materials, chemicals, transportation fuels, power and/or heat from biomass and which can easily be used in existing industrial infrastructures as a substitute for conventional fossil-based fuels and raw materials;
3) Mixed sugars, $C_5$ and $C_6$ sugars, which are further refined substrates for chemical and bioconversion and which mainly originate from side streams in the food industry and potentially from ligno-cellulosic biomass streams;
4) Pyrolysis oil, i.e. oil produced in fast and flash pyrolysis processes which can be used for indirect co-firing for power production in conventional power plants, for direct decentral heating purposes, and potentially as high energy density (important in case of long distance transportation) bio-based intermediates for the final production of chemicals and/or transportation fuels; and
5) Biocrude, i.e. fossil oil-like mixture of hydrocarbons with low oxygen content, which results from severe hydro-thermal-upgrading of relatively wet biomass and which potentially can, like its petroleum analog, be used for the production of materials, chemicals, transportation fuels, power, and/or heat.

Refined biomass comprises primarily mixed sugars, fatty acids, or syngas. The transformation of refined biomass into a variety of chemical products, such as fuels, is a very complicated process due to the importance of separation technology in providing an efficient and cost effective biocatalytic production process. Different refined biomasses require different treatments to become useful products. For example, fatty oil is processed through a transesterification reaction to produce useful biodiesel fuel. In this case, KOH is used as a catalyst while fats and oil react with methanol. However, the complicated process involves complicated separation paths and is apparently neither effective nor efficient.

The NEMCA effect is based on the discovery that by applying an electric voltage between, on the one hand, an active material which is applied, preferably in the form of layers, to a solid electrolyte and, on the other hand, a further metallic substrate, also preferably in the form of layers, which is in turn connected to the solid electrolyte, it is possible for the activity or selectivity of a catalyst to be greatly altered. More particularly, it has been found that when using an $O^{2-}$, $H^+$, or other ion conducting solid electrolyte in a catalytic electrochemical device, the catalytic reaction rate is significantly greater (on the order of $10^5$ times greater) than the Faradaic rate. These phenomena have been observed, for example, in the hydrogenation of unsaturated organic compounds. See U.S. Pat. No. 6,194,623, which teaches a process for the selective hydrogenation of at least one organic compound having at least one unsaturated group, using the NEMCA effect, wherein the at least one organic compound having at least one unsaturated group is a hydrocarbon having C—C double bonding or at least one C—C triple bond, or a mixture of at least one hydrocarbon having at least one C—C double bond and at least one hydrocarbon having at least one C—C triple bond. The at least one organic compound is brought into contact with a hydrogen-containing gas in the presence of a catalyst, wherein the catalyst comprises an active material which is applied to a solid electrolyte to which, in turn, a metallic substrate is connected in such a way that a current flows through the solid electrolyte, so that the active material can be kept at a constant potential and a voltage is applied to the catalyst during the hydrogenation. More than 70 different catalytic reactions (oxidations, hydrogenations, dehydrogenations, isomerizations, decompositions) have been electrochemically promoted on Pt, Pd, Rh, Ag, Au, Ni, $IrO_2$, and $RuO_2$ catalysts. The solid electrolytes are $O^{2-}$ conductors, such as $Y_2O_3$ stabilized $ZrO_2$ (YSZ), $H^+$ conductors, such as $CaZr_{0.9}In_{0.1}O_{3-\alpha}$ and NAFION®, $F^-$ conductor ($CaF_2$), and the like. However, no incremental chain increases have been found to occur.

Deoxygenation and decarboxylation are rarely reported at high temperatures with big molecules, for example, chains with more than five carbons. However, in the liquid phase, decarboxylation has been reported. See, for example, U.S. Pat. No. 6,238,543, which teaches a process for electrolytic coupling of carboxylic acids carried out in a polymer electrolyte membrane reactor in which gaseous or neat (i.e. without water) liquid reactants are used without the use of organic co-solvents while preventing the loss of platinum and permitting the use of oxygen reduction to water as the cathode reaction. In this case, the use of a neat organic acid is necessary to prevent oxygen production at the anode electrode. Consequently, the method disclosed therein, which is necessarily carried out at temperatures less than 120° C. due, among other things, to limitations of the NAFION electrolyte employed therein and which requires cell potentials of at least about 3.0 volts, cannot be used for bio-oil treatment due to the presence of about 17% by weight water therein.

SUMMARY OF THE INVENTION

It is, thus, one object of this invention to provide a high temperature NEMCA reactor coupling high temperature biomass hydrolysis and hydropyrolysis products to produce high heat value, long C—C chain fuels.

It is another object of this invention to provide a method for deoxygenation and decarboxylation in which a catalyst is used for promotion of the deoxygenation and decarboxylation reactions.

It is yet another object of this invention to combine the catalytic decarboxylation and deoxygenation with electrochemical oxidation/reduction.

These and other objects of this invention are addressed by a method for producing biofuels comprising the steps of introducing a refined biomass material comprising water into a non-Faradaic electrochemical device and deoxygenating and/or decarboxylating the refined biomass material in the device, producing an increased carbon chain fuel. In accordance with one preferred embodiment, the reactions are carried out at a temperature greater than or equal to about 150° C. For a refined biomass material in which the reactants are an organic acid and alcohol, the reactions are as follows:

At the anode: 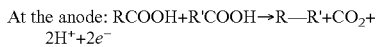

At the cathode: 

where R and R' are preferably selected from the group consisting of alkyl, substituted alkyl, alkenyl, substituted alkenyl, alkynyl, substituted alkynyl, phenyl, substituted phenyl, aralkyl, ring-substituted aralkyl, and mixtures thereof. Carbohydrate and fatty acid biomass can be electrochemically treated to become useful fuels at elevated temperatures. The selective oxidation and reduction method eliminates impurity separations in the process of biofuel production because the R—R' product is more hydrophobic and easy to separate from hydrophilic liquid. At the same time, the electrochemically promoted catalysis increases the biofuel reaction kinetics. Reactor surface fouling which may occur can be removed by electric shocking.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Definitions

As used in the description and claims, the term "increased carbon chain fuel" refers to a fuel in which the carbon chain is incrementally longer than the carbon chains of the individual reactants.

As used in the description and claims, the term "refined biomass material" refers to carbohydrates, organic acids, and alcohols derived from biomass.

As used in the description and claims, the term "non-Faradaic electrochemical device" refers to an electrochemical cell comprising a proton conductive membrane disposed between a catalytic anode electrode and a catalytic cathode electrode in which electricity from an external source is provided between the catalytic anode electrode and the catalytic cathode electrode, resulting in increased catalytic activity or selectivity.

In this invention, non-Faradaic electrochemical modification of catalytic activity is used to convert refined biomass materials to useful fuels. In accordance with one embodiment of this invention, a high temperature proton conductive membrane is used to transport protons from the anode electrode to the cathode electrode of an electrochemical cell at a temperature greater than about 150° C., preferably at a temperature in the range of about 150° C. to about 600° C. Operation at these temperatures enables the use of cell potentials less than or equal to about 2.5 volts, substantially lower than conventional NEMCA systems. Under these conditions, alcohols can be deoxygenated and organic acids can be decarboxylated. In accordance with one preferred embodiment, a silver-containing catalyst employed in the anode electrode is deposited onto one side or face of a proton conductive membrane and a NiO-containing catalyst employed in the cathode electrode is deposited onto the opposite side or face of the proton conductive membrane. External electricity is added between the anode and cathode electrodes to promote the deoxygenation and decarboxylation reactions. Any external source of electricity may be employed. In accordance with one preferred embodiment of this invention, the electricity is generated by a renewable energy source, such as solar energy, wind energy, geothermal energy, wave energy or tides, and the like. The method of this invention is particularly suitable for use with such renewable energy sources as it provides a means for storing such energy forms. In addition, the fuels generated by the process may be used to generate electricity, which, in turn, may be introduced into the electrical grid as needed or desired, such as at times of peak loads.

Figure 1:
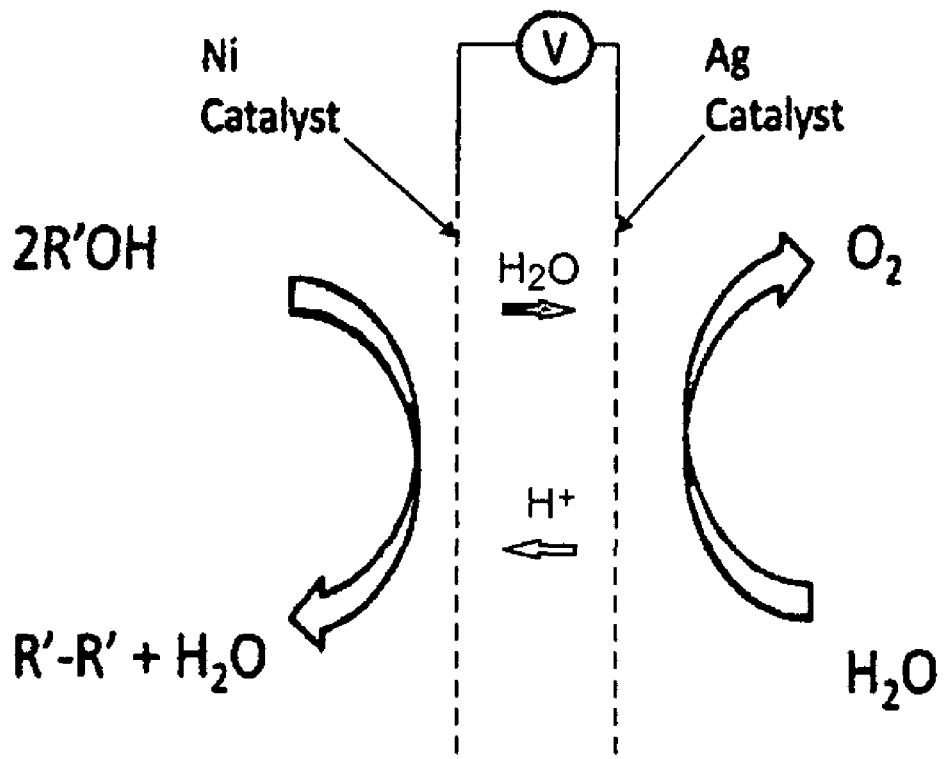
FIG. 1 is a diagram showing the deoxygenation of OH-based refined biomass products such as sugar and alcohol to high heat capacity fuel in accordance with one embodiment of this invention.
Figure 2:
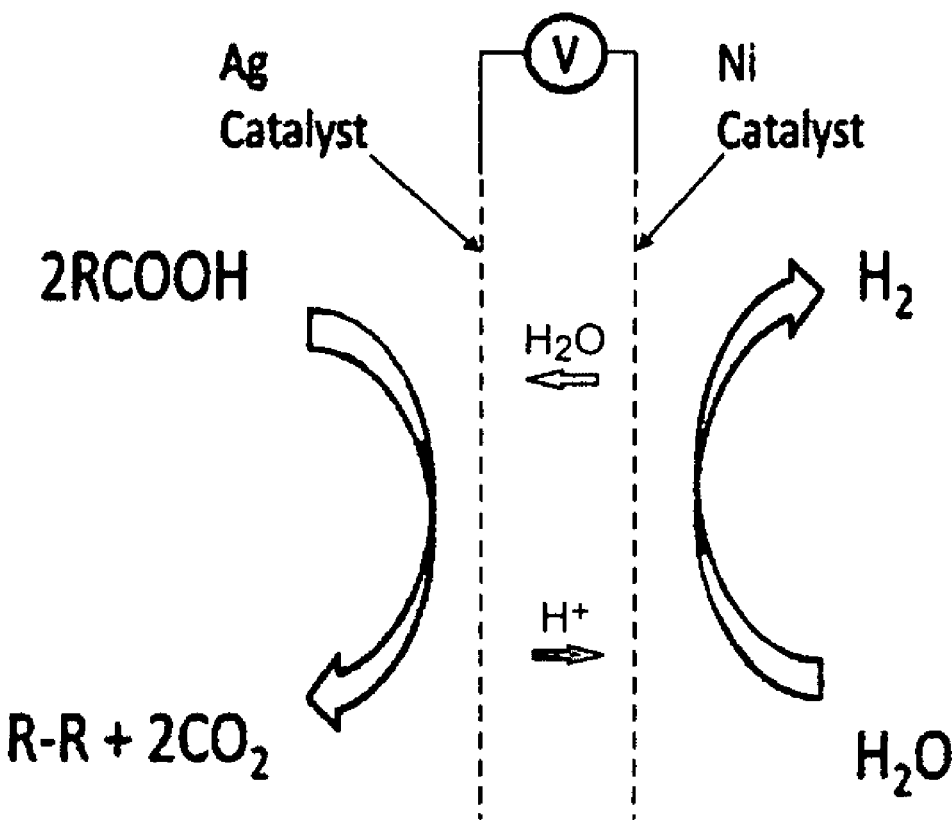
FIG. 2 is a diagram showing the decarboxylation of a refined biomass material comprising acid-based biomass products, such as fatty acids, to high heat value capacity fuel.
Figure 3:
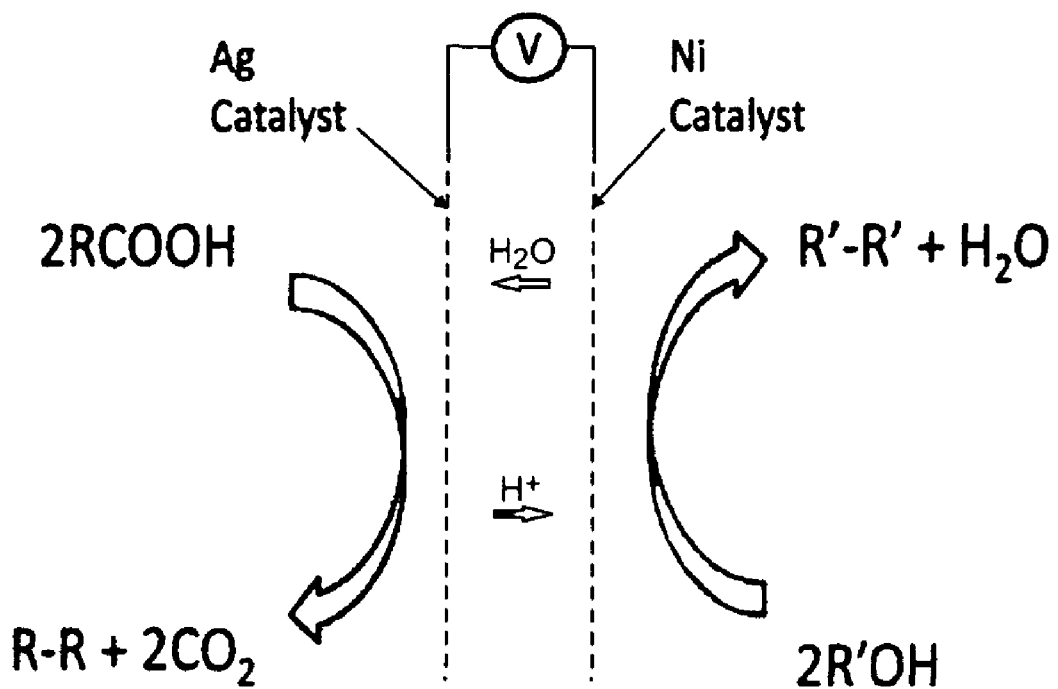
FIG. 3 is a diagram showing a combined deoxygenation and decarboxylation reaction for making high heat value fuel from alcohol and organic acid.

FIG. 1 shows the reaction diagram in accordance with one embodiment of this invention in which the refined biomass material comprises OH (hydroxyl)-based biomass products on the cathode electrode facing side of the proton conductive membrane and the deoxygenation reaction occurs at the cathode electrode. FIG. 2 shows the reaction diagram in accordance with one embodiment of this invention in which the refined biomass material comprises acid-based biomass products disposed on the anode electrode facing side of the proton conductive membrane and decarboxylation occurs at the anode electrode. FIG. 3 shows the reaction diagram in accordance with one embodiment of this invention for a combined reactor in which OH-based biomass products are disposed on the cathode electrode facing side of the proton conductive membrane and acid-based biomass products are disposed on the anode electrode facing side of the proton conductive membrane, wherein deoxygenation occurs at the cathode electrode and decarboxylation occurs at the anode electrode. In accordance with one embodiment of this invention, carbohydrates are provided to the cathode electrode facing side of the proton exchange membrane.

Figure 4:
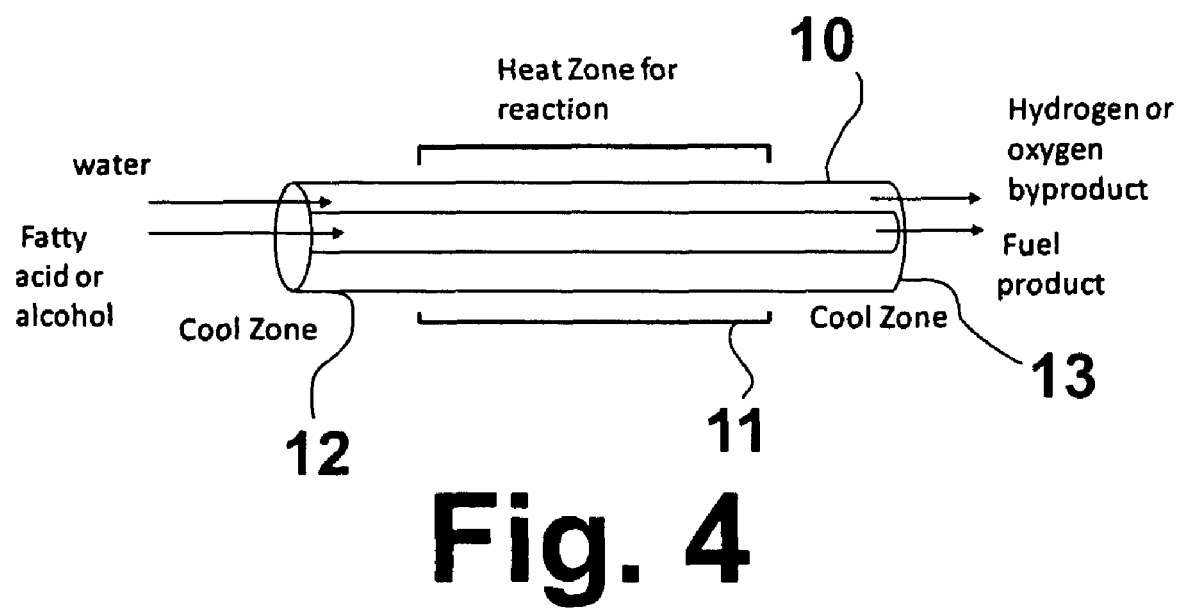
FIG. 4 is a simplified diagram of a NEMCA reactor in accordance with one embodiment of this invention.

FIG. 4 shows a possible reactor design suitable for use in accordance with one embodiment of this invention. As shown therein, a tubular reactor vessel 10 is used to carry out the reaction. In this reactor, the heated zone 11 is heated for electrochemical reduction/oxidation reactions. Biorefined biomass is introduced into a cool zone at one end 12 of the reactor tubes and the products flow out through a cool zone at the opposite end 13 of the reactor tubes. One of the benefits of this arrangement is that the end cool zones enable good seals for ceramic tubes. The tubes are preferably alumina ceramic tubes embedded with proton conductive ceramic materials, such as rare earth cerate and zirconate perovskites. The ceramic electrolyte that promotes ion and charge transfer and separates the anode and cathode electrodes, also insulates the anode and cathode electrodes. This creates an electrical potential between the anode and cathode electrodes. As a result, the electrons may be released to an external circuit. This direct generation process is analogous to the operation of a battery except that the battery contains all of the necessary reactants internally. Catalysts are deposited on both sides of the alumina tubes and perforated nickel tubes or nickel gauzes are used as current collectors.

Tubular reactors suitable for use in accordance with one embodiment of this invention may be prepared using well known tubular solid oxide fuel cell manufacturing methods. The primary difference is the use of proton conductive perovskite oxide materials instead of oxygen ion conductive ceramics. For example, ytterbium doped strontium cerate or yttrium doped strontium zirconate materials may be milled with plasticizers, such as cellulose, and solvent, such as xylene, with the resulting mixture being dried and ground to make a paste for extrusion. After extrusion, the ceramic tubes are dried and sintered. Meanwhile, catalyst wet deposition on the anode and cathode electrodes is also performed. Proton conductive ceramics suitable for use in this invention include, but are not limited to, $SrCeO_3$, $BaCeO_3$, $CaZr_{0.9}In_{0.1}O_{3-\alpha}$, and $ABO_3$ formula oxides, such as $LaP_3O_9$.

Conway, B. E. et al., "New Approaches to the Study of Electrochemical Decarboxylation and the Kolbe Reaction", *Canadian Journal of Chemistry*, Vol. 41 (1963), pp. 38-54, teaches that, in an aqueous solution, the decarboxylation reaction is almost completely inhibited by oxygen evolution in a Faradaic mode of operation. In the invention disclosed herein, the Faradaic reaction is reduced and the non-Faradaic reaction is promoted by using high oxygen evolution overpotential catalysts at the anode electrode. Electrochemical refining of bio-oil in accordance with the method of this invention overcomes the problem of oxygen evolution by using highly corrosion resistant bipolar plates, e.g. gold-plated or platinum-plated bipolar plates, with highly proton conductive membranes as well as high oxygen evolution overpotential catalysts, such as Ni or Ag deposited on $PbO_2$, Ni—$PbO_2$/$SnO_2$, and other support materials having an energy bandgap more than 2.0 eV, including diamond powders. For example, Ag—$PbO_2$/$SnO_2$ catalyst has an oxygen evolution overpotential at 2.5 V vs. NHE (normal hydrogen electrode) compared with Pt at 1.3 V vs. NHE. Thus, the decarboxylation reaction is more competitive than oxygen evolution at the anode.

Ag—$PbO_2$/$SnO_2$ catalyst may be synthesized by dissolving 0.3 g $AgNO_3$ in 50 ml of deionized water with 0.74 g $PbO_2$ and 0.05 g $SnO_2$, producing a colloid solution, which is then titrated by 0.1 M sodium boron hydride ($NaBH_4$) to deposit Ag on $PbO_2$/$SnO_2$. The resulting solution is then filtrated to produce a solid powder, which is thoroughly washed and dried for use in electrode preparation.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

I claim:

1. A method for producing fuels comprising the steps of:
   introducing water and a feedstock material comprising at least one of a carbohydrate, an organic acid, and an alcohol into a non-Faradaic electrochemical device;
   providing electricity from an external source between a catalytic anode electrode and a catalytic cathode electrode of said non-Faradaic electrochemical device; and
   at least one of deoxygenating and decarboxylating said feedstock material in said device, producing an increased carbon chain fuel.

2. The method of claim 1, wherein said device is operating at a temperature greater than or equal to about 150° C.

3. The method of claim 1, wherein said feedstock material is selected from the group consisting of waste materials, waste water, refined biomass materials, waste engine oil, and mixtures thereof.

4. The method of claim 1, wherein said feedstock material comprises said organic acid disposed on an anode electrode facing side of a proton conductive membrane.

5. The method of claim 4, wherein said feedstock material comprises at least one of said carbohydrate and said alcohol disposed on a cathode electrode facing side of said proton exchange membrane.

6. The method of claim 1, wherein said feedstock material comprises said alcohol disposed on a cathode electrode facing side of a proton conductive membrane.

7. The method of claim 1, wherein said non-Faradaic electrochemical device is operated at an electrical potential of less than or equal to about 2.5 volts.

8. The method of claim 1, wherein said catalytic anode electrode comprises a Ag-containing catalyst.

9. The method of claim 1, wherein said catalytic cathode electrode comprises a Ni-containing catalyst.

10. The method of claim 1, wherein said non-Faradaic electrochemical device comprises a proton conductive membrane comprising a ceramic material.

11. The method of claim 1, wherein said external electricity is provided to said non-Faradaic electrochemical device by a renewable energy source.

12. The method of claim 11, wherein said renewable energy source is selected from the group consisting of solar energy, wind energy, geothermal energy, wave energy, and combinations thereof.

13. In an electrochemical device comprising a proton conductive membrane disposed between a catalytic anode electrode and a catalytic cathode electrode and an external electricity source providing electricity between said catalytic anode electrode and said catalytic cathode electrode, a method for producing fuels comprising the steps of:
   introducing water and a feedstock material comprising at least one of a carbohydrate, an organic acid, and an alcohol into said electrochemical device;
   providing electricity from an external source between said catalytic anode electrode and said catalytic cathode electrode of said electrochemical device; and
   at least one of deoxygenating and decarboxylating said feedstock material, forming an increased carbon chain fuel.

14. The method of claim 13, wherein said feedstock material is selected from the group consisting of waste materials, waste water, refined biomass materials, waste engine oil, and mixtures thereof.

15. The method of claim 13, wherein said electrochemical device is operated at a temperature greater than or equal to about 150° C.

16. The method of claim 15, wherein said temperature is in a range of about 150° C. to about 600° C.

17. The method of claim 13, wherein said electrochemical device is operated at an electrical potential of less than or equal to about 2.5 volts.

18. The method of claim 13, wherein said catalytic anode electrode comprises a Ag-containing catalyst.

19. The method of claim 13, wherein said catalytic cathode electrode comprises a Ni-containing catalyst.

20. The method of claim 13, wherein said organic acid is disposed on an anode electrode facing side of said proton conductive membrane.

21. The method of claim 20, wherein said at least one of said carbohydrate and said alcohol is disposed on a cathode electrode facing side of said proton exchange membrane.

22. The method of claim 13, wherein said alcohol is disposed on a cathode electrode facing side of said proton conductive membrane.

23. The method of claim 13, wherein said external electricity is provided by a renewable energy source.

24. The method of claim 23, wherein said renewable energy source is selected from the group consisting of solar energy, wind energy, geothermal energy, wave energy, and combinations thereof.

25. The method of claim 13, wherein said proton conductive membrane comprises a ceramic material.

26. The method of claim 13, wherein electrical shocking is used to prevent electrode surface fouling and particulate deposition on said electrodes.

* * * * *